Oct. 20, 1970  W. R. BELLIS  3,534,907
FOG ABATEMENT DEVICE AND METHOD
Filed Dec. 7, 1967  2 Sheets-Sheet 2
FIG. 3
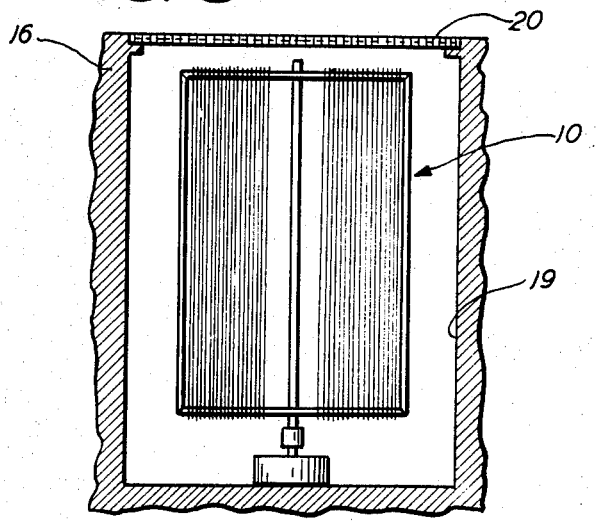
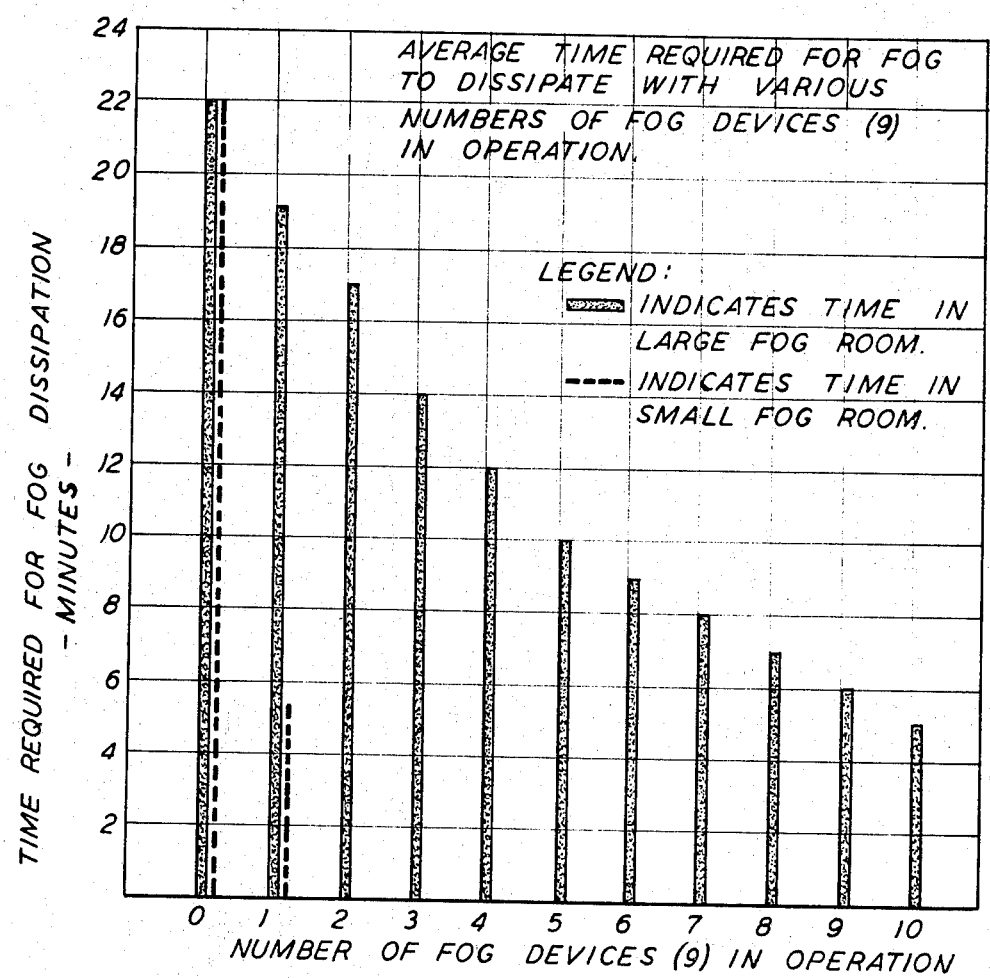
FIG. 4
INVENTOR
WESLEY R. BELLIS
BY
ATTORNEY United States Patent Office 3,534,907
Patented Oct. 20, 1970

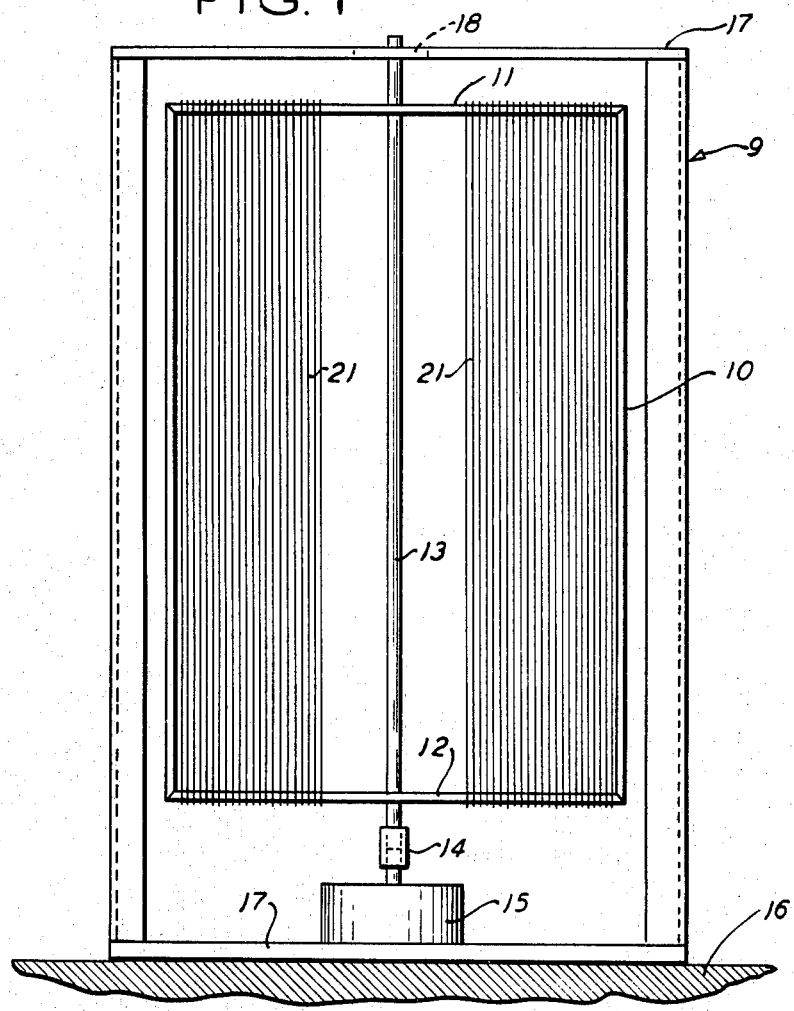
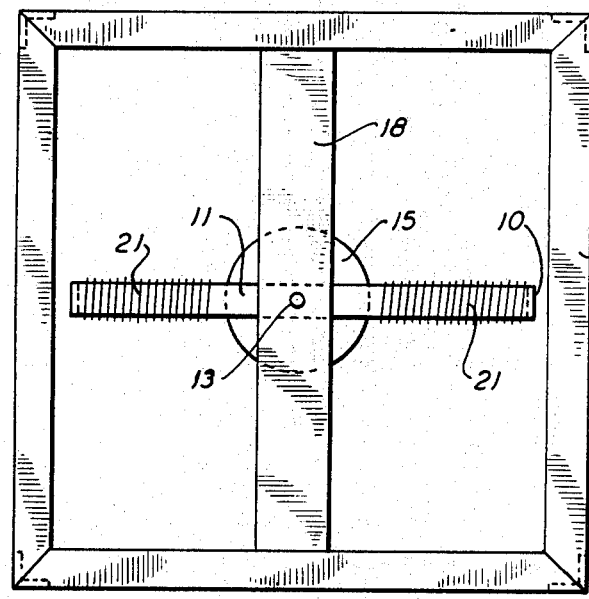

3,534,907
FOG ABATEMENT DEVICE AND METHOD
Wesley R. Bellis, Manasquan, N.J., assignor to State of New Jersey, Department of Transportation
Filed Dec. 7, 1967, Ser. No. 688,840
Int. Cl. A01g 15/00; E01h 13/00
U.S. Cl. 239—2
12 Claims

ABSTRACT OF THE DISCLOSURE

An apparatus and method for fog abatement including use of a frame provided with a plurality of strands, the frame being rotated and thereby causing the fog to be dispersed and the air cleared.

FOG ABATEMENT DEVICE AND METHOD

This invention relates to a device and method for abatement of fog including use of a frame, the fog being dissipated and cleared, on relative movement of the fog laden air and frame.

Fog, especially on highways and expressways, presents great danger of injury to person and property. It is dangerous to drive through fog-shrouded areas even at lowest speeds, the fog cutting off visibility of traffic lights and signs, roadways, other vehicles and persons on or near the highway. Where motorists approach fog areas at high speed and do not reduce speed, driving essentially without visibility or with substantially reduced visibility, the situation is especially dangerous, and frequently causes chain accidents with ensuing loss of life and serious personal injuries.

The invention provides an effective fog abatement device and method for use in specific or extended areas, clearing them of fog and being highly effective for the purpose.

In the drawings, wherein similar reference characters indicate like parts:

FIG. 1 is a side elevational view of a fog abatement device embodying the invention, FIG. 2 is a top plan view thereof, FIG. 3 is a schematic sectional view showing such device positioned below ground level, and FIG. 4 is a chart illustrating the effectiveness of the invention.

As shown in the drawings, the device 9 of the invention is positioned on a supporting surface 16, which may be a roadway or a shoulder or other area of the roadway. The frame 10 may comprise spaced horizontal bars 11 and 12 fixed to a medial shaft 13, rotated therewith through suitable means, such as an electric motor and speed reducer 15 and coupling 14. Supporting surface 16 may be the body of a vehicle towing the device through the area to be cleared of fog, or a fixed vehicle or surface as above noted.

Shaft 13 and associated parts may be keyed to or driven by the motor armature directly or indirectly, as through a speed reducer. The motor housing 15, in turn, may be mounted on the casing 17, which may be a frame such as shown in FIG. 2, with a medial supporting plate 18 at the top, in which rod 13 is suitably journaled for free rotation.

In the form shown in FIG. 3, the frame 10 is mounted below a roadway or other surface 16, for example, in a recessed area 19 therein, and may, if desired, be covered with a protective grill 20. The device may be mounted on or in a vehicle, such as a flat bed truck (surface 16 in such case, being the truck body) to be drawn through the area, for clearing the fog; several vehicles may be used in tandem or otherwise for example, for carrying out the invention.

A number of the devices may be assembled in an area where it is desired to abate fog; automatic controls (such as photoelectric devices) may be provided to start the motor 15 and start the frame 10 rotating as soon as the fog has reached a predetermined density, rotation continuing until visibility returns to predetermined acceptable level for safe driving, for example, or for visibility.

Strands 21 of nylon are secured to the horizontal bars 11 and 12 so as to be disposed perpendicularly to the surface 16 on which the device is positioned, the strands being thus oriented to the force of gravity and in the longer axis of frame 10. Strands 21 may be oriented parallel or otherwise than perpendicular to surface 16, centrifugal force being then relied on in the operation and use of the invention.

It is believed that best results may be achieved by use of eight-pound test monofilament nylon spaced at twenty strands 21 per inch, rotated about 90 r.p.m. and disposed perpendicularly to the supporting surface 16. The term "strands" as used in this specification and in the claims, shall be deemed to mean individual strands such as above-described and shown in the drawings as finite strands 21 secured to the frame 10, or strands molded or otherwise formed in joined relation with spaces formed therebetween or comprise essentially an open mesh.

Where the device is installed below ground level (FIG. 3) with open grids 20 covering the excavation area or recess 19, fog, dispersed to a height above surface 16, collects in the recessed area 19 and may be drained therefrom. Operation of the device, as set forth above, is believed due to fog droplets collecting on the nylon strands 21, and, when becoming sufficiently large, descending slowly therealong or being thrown off by centrifugal force on rotation of the device. The water molecules, being forced through the nylon strands, perhaps form larger units, combining with one another, these in turn collecting on the strands.

It has been found desirable to space the strands outwardly of the medial shaft 13—3 to 4 inches having been found to be satisfactory, as the thus eliminated strands do not appear to appreciably collect moisture, to afford a large enough diameter of rotation of the strands 21 to assure sufficient air contact on rotation of the frame.

The nylon strands 21 may be formed otherwise than as shown in the drawings as strands would on the frame.

Experiments have been conducted pursuant to the invention, with use of various materials and under various conditions as set forth below, with a device having the following basic parameters:

(a) a framework 10 30 inches by 48 inches;
(b) wound with 8-lb. test monofilament nylon strands 21;
(c) parallel to the longer dimension of the frame;
(d) spaced at 20 lines per inch;
  operated on the following parameters:
    (a) frame 10 rotated at about 90 r.p.m.
    (b) horizontally rotated
    (c) with the vertical axis of rotation through the longer dimension of frame 10.

FIG. 4 is a plot of the time required to abate fog to a predetermined level of visibility versus the number of fog devices 9 of the invention in use, varying from about 22 minutes when no devices 9 are used to about 5 minutes when ten devices 9 are operated.

The density of fog prior to an abatement operation is reproducibly produced as measured by the electrical output of a photoelectric cell detector. The proper humidity of the chamber is established by repeatedly producing the fog and permitting it to abate by itself without the use of the rotating devices 9 until two successive experiments require approximately 22 minutes to reestablish the predetermined level of visibility. This predetermined level of visibility has been arbitrarily established as that visibility which exists when the output of the particular photoelectric cell detector in use is 23 microamperes. The reproductively produced density of fog is arbitrarily established as that level of visibility which exists when the output of the detector is 6 microamperes. In both measurements the lights in the fog chamber are on.

Data obtained from experiments involving these basic parameters are then used as "base-lines" for comparable experiments in which parameters are varied. That is, a basic device is compared with a modified device.

The effectiveness of the device is measured by the improvement in visibility versus time, determined both by personal observation and by the output of the photoelectric cell detector. During operation of the device a record is kept of the time required to produce a 17 microamp increase in the visibility meter reading.

The efficiency of the device is measured by determining the moisture collecting capacity of the device expressed in cubic centimeters of water collected per minute of device operation (see Tables I and II below).

A collecting device which can be attached to the fog device 9 under test has been used having shields on each side and a pan on the bottom so that it will collect the water droplets which are thrown off by the device 9 by centrifugal force, as well as the droplets which run off the same due to gravity.

Table I shows results obtained in a large fog room (6000 cu. ft.). The standard fog device 9 wound with 8-lb. test nylon strands 21 collected an average of 5.8 cc. of water per minute of operation. An experimental device 9 wound with Dacron collected 4.8 cc. of water per minute. The nylon device abated the fog in an average time of 19 minutes, and the Dacron device required an average of 21½ minutes. A device was wound with 8-lb. test nylon strands 21 with the strands in the horizontal direction. This device did not abate fog as rapidly as the standard device with the nylon strands in the vertical direction (21 minutes vs. 19 minutes). The assembly holding the standard device was placed on its side and the device rotated. The fog did not abate as rapidly as it did when the device was rotating with its axis in the vertical position. (21.5 minutes vs. 19 minutes.)

When only one device 15 operated in the large fog room it requires a long time to compare the effectiveness and efficiency of various devices. Therefore, a movable plastic curtain was installed so that a single fog device can be tested in a portion of the fog room equal to about 20% of the original fog room volume. The time required for the fog to abate itself in this smaller volume room is the same as for the original room, but the time required for abatement with one device in operation is considerably less.

Table II shows results obtained in the small fog room (1200 cu. ft.).

Strand spacings 21 from 12 per inch to 24 per inch have been tried and it has been found that the closer the spacing the better the fog abating characteristics, providing the strands are not so close that the spaces between them fill up with water. A spacing of 20 per inch has been found to be optimum.

The devices have been rotated at speeds from 50 to 130 r.p.m. At speeds above 90 r.p.m. the device 9 acts as a fan and creates air currents which would move fog from an uncleared area into the cleared area. The fog abating ability of the device decreases when the speed of rotation is reduced below 90 r.p.m. Therefore, 90 r.p.m. has been selected as the optimum speed to be used with devices of the standard design.

Experimental devices have also been constructed using 30-lb. test and 60-lb. test monofilament nylon strands. These nylon strands 21 stretched so much that the strands stuck together and the devices fanned the fog with very little fog abatement.

Enameled copper wire was tried, but this stretched, and the strands stuck together. Stainless steel wire also stretched and the strands stuck together. Experimental devices have been constructed using polypropylene, rubberized horse hair and pig hair, nylon mesh, and a louvered metal sheet ("Kool Shade"), but none of these materials has shown as good all-around results as the 8-lb. test monofilament nylon strands 21.

The stainless steel wire with the strands stuck together collected slightly more water than the nylon, but was not as effective as the nylon in the improvement of visibility. This was probably due to the greater fan action which brought fog from uncleared areas into the cleared area being measured by the photoelectric cell. The same condition existed with the polypropylene, but in this case the greater fan action may have been caused by the increased cross-section of the strands (.050" vs. .012 for the nylon). The "Kool Shade" device also produced a fan action. Another disadvantage of these devices lies in the fact that they would have to be constructed and mounted very strongly to prevent wind damage in outdoor installations.

The rubberized horse hair and pig hair were effective in improving the visibility, but they absorbed the water and it was not dropped into the collector. After they were soaked with water they were not as effective in visibility improvement. In addition, they had a very objectionable odor when wet.

FIG. 4 is a chart showing the average time required for fog to dissipate with various numbers of fog devices 9 in operation in large and small fog room as above described.

The experiments mentioned above (and in Tables I and II below) were conducted in chambers wherein fog was controllably artificially produced, devices of the invention being placed therein, with lights and light detectors and visibility meters detecting the light output and thus the fog clearing efficacy and time factors.

TABLE I.—AVERAGES OF TEST RESULTS OBTAINED WITH SINGLE DEVICE OPERATING IN 6000 CU. FT. OF FOG.

| Device design No. | Winding direction, material and spacing | Time required to produce a 17 micro-amp increase on visibility meter, min. | Water collected per minute of operation, cc |
|---|---|---|---|
| 3 | Vertical .050 polypropylene (14/inch) | 21 | 5.9 |
| 6 | Vertical Dacron (16 inch) | 21½ | 4.8 |
| 7 | Vertical 8 lb. nylon: | | |
|  | (20/inch) | 19 | 5.8 |
|  | (rotated horizontally) | 21½ | |
| 8 | Diagonal 8 lb. nylon (20/inch) | 20 | |
| 9 | Horizontal 8 lb. nylon (20/inch) | 21 | |
| 10 | Enameled copper wire (#34) | | |
| 11 | Rubberized hair mat (30" × 26") | | 4.2 |
| 12 | Rubberized hair mat (24" × 48") | | 1.0 |
| 13 | Vertical kool shade | | 5.6 |
| 14 | Horizontal kool shade | | |
| 15 | Rubberized hair, 12 hinged pieces (4" × 15") | | |
| 16 | Nylon mesh, 144 openings/sq. in. | | |
| 17 | Stainless steel wire (20 per inch), vertical | | |

TABLE II.—AVERAGES OF TEST RESULTS OBTAINED WITH SINGLE DEVICE OPERATING IN THE CURTAINED ROOM CONTAINING 1200 CU. FT. OF FOG

| Device design No. | Winding direction, material and spacing | Time required to produce a 17 micro-amp increase on visibility meter, min. | Water collected per minute of operation, cc. |
|---|---|---|---|
| 3 | Vertical .050 polypropylene (14/inch) | 5.7 | 6.9 |
| 6 | Vertical Dacron (16/inch) | | |
| 7 | Vertical 8 lb. nylon (20/inch) | 5.4 | 6.6 |
| 8 | Diagonal 8 lb. nylon (20/inch) | | |
| 9 | Horizontal 8 lb. nylon (20/inch) | | |
| 10 | Enameled copper wire (#34) | 6.1 | 6.5 |
| 11 | Rubberized hair mat (30" X 26") | | |
| 12 | Rubberized hair mat (24" X 48") | | |
| 13 | Vertical kool shade | 6.2 | 7.2 |
| 14 | Horizontal kool shade | 6.5 | 7.1 |
| 15 | Rubberized hair, 12 hinged pieces (4" X 15") | 5.5 | 3.0 |
| 16 | Nylon mesh, 144 openings/sq. in | 6.1 | 5.0 |
| 17 | Stainless stell wire (20 per inch), vertical | 7.3 | 7.1 |

I claim:

1. In a fog abatement device, a frame, a plurality of vertically disposed strands secured to said frame in closely spaced relation,
   said strands being nylon strands,
   and means for rotating said frame about a vertical axis, to thereby abate the fog.

2. In a fog abatement device as set forth in claim 1, said strands being made of nylon monofilament.

3. In a fog abatement device as set forth in claim 1, said strands being closely spaced in parallel relation, and means for mounting said frame perpendicularly to a supporting surface, to thereby dispose said strands perpendicularly to said surface.

4. In a fog abatement device as set forth in claim 1, means for positioning said frame perpendicularly to a supporting surface,
   a medial post in said frame disposed on said vertical axis, and end members extending substantially perpendicularly thereto for thereby supporting the strands on said supporting surface.

5. In a fog abatement device as set forth in claim 4, means for rotating the post and thereby rotating the frame and strands.

6. In a fog abatement device as set forth in claim 1, said means so rotating the frame at about 90 r.pm.

7. In a fog abatement device as set forth in claim 4, said strands being so secured to the frame from a position spaced outwardly of the post.

8. In a fog abatement removal device as set forth in claim 1,
   said strands being made of about eight pounds test nylon.

9. In a fog abatement device as set forth in claim 1, said strands being so spaced about twenty per inch.

10. The method of fog abatement comprising positioning a frame having a plurality of vertically disposed nylon monofilament strands in an area having a fog condition, and rotating said frame about a vertical axis on a supporting surface in said area to abate the fog.

11. In a method as set forth in claim 10, the further step of rotating said frame at about 90 r.p.m 12. In the method as set forth in claim 10, the further step of forming said strands of about eight pounds test nylon and spacing them apart about 20 per inch.

References Cited

UNITED STATES PATENTS 3,407,733    10/1968    Copas _____ 239—14

FOREIGN PATENTS 7,407    5/1927    Australia.
1,135,940    3/1961    Germany.

OTHER REFERENCES

Papers in Physical Oceanography and Meteorology, publ. by Mass. Inst. of Technology and Woods Hole Oceanographic Institution, vol. VI, No. 3, "On the Local Dissipation of Fog," by H. G. Houghton and W. H. Radford, p. 20.

LLOYD L. KING, Primary Examiner

U.S. Cl. X.R.

239—14